United States Patent [19]
Ehnert et al.

[11] Patent Number: 5,292,570
[45] Date of Patent: * Mar. 8, 1994

[54] DIMENSIONALLY STABLE THERMOPLASTIC SEMIFINISHED PRODUCT

[75] Inventors: Gerd Ehnert, Graben-Neudorf; Manfred Ehlers, Kraichtal-Unteröwisheim; Rolf von Paumgartten, Wiesloch, all of Fed. Rep. of Germany

[73] Assignee: Menzolit GmbH, Kraichtal-Menzingen, Fed. Rep. of Germany

[*] Notice: The portion of the term of this patent subsequent to Dec. 12, 2006 has been disclaimed.

[21] Appl. No.: 482,763

[22] Filed: Feb. 21, 1990

Related U.S. Application Data

[62] Division of Ser. No. 154,325, Feb. 10, 1988, Pat. No. 4,935,182.

[30] Foreign Application Priority Data

Feb. 10, 1987 [DE] Fed. Rep. of Germany ....... 3704037
Aug. 13, 1987 [DE] Fed. Rep. of Germany ....... 3726921

[51] Int. Cl.[5] .......................... B32B 1/04; B32B 3/02
[52] U.S. Cl. ........................... 428/74; 428/280; 428/282; 428/286; 428/288; 428/364; 428/375
[58] Field of Search .................... 428/318.8, 375, 372, 428/373, 400, 364, 367, 280, 288, 282, 284, 74, 286

[56] References Cited

U.S. PATENT DOCUMENTS

| | | | |
|---|---|---|---|
| 3,055,783 | 9/1962 | Hendrickson et al. | 428/74 |
| 3,573,148 | 3/1971 | Habgood, Jr. et al. | 428/74 |
| 3,862,287 | 1/1975 | Davis | 264/131 |
| 3,863,758 | 2/1975 | Connelly | 428/74 |
| 3,928,693 | 12/1975 | Rudloff | 428/74 |
| 3,988,406 | 10/1976 | Nakamura et al. | 264/68 |
| 4,163,832 | 8/1979 | Saidla | 428/318.8 |
| 4,464,429 | 8/1984 | Michaud-Soret | 428/286 |
| 4,649,080 | 3/1987 | Fischer et al. | 428/419 |
| 4,789,577 | 12/1988 | Leone et al. | 428/408 |
| 4,886,701 | 12/1989 | Ehnert et al. | 428/282 |
| 4,927,706 | 5/1990 | Born | 428/316.6 |

FOREIGN PATENT DOCUMENTS

77727 4/1983 European Pat. Off. .............. 428/74

Primary Examiner—Patrick J. Ryan
Assistant Examiner—J. M. Gray
Attorney, Agent, or Firm—Antonelli, Terry, Stout & Kraus

[57] ABSTRACT

A semifinished product formed from fiber reinforced thermoplastic material, with the semifinished product including a solid covering of fibers and thermoplastic material, which resolidifies, after melting, and a felt or wadding-like core of a fiber-polymer mixture. The core may be formed from a compressed material and the semifinished product may have either a cylindrical or oval shape. The solid covering has a thickness of less than 20% of the radius of the semifinished product, with the thickness preferably being a maximum of 10 millimeters.

5 Claims, 2 Drawing Sheets

DIMENSIONALLY STABLE THERMOPLASTIC SEMIFINISHED PRODUCT

This application is a divisional of application Ser. No. 154,325, filed Feb. 10, 1988, now U.S. Pat. No. 4,935,182.

BACKGROUND OF THE INVENTION

The present invention relates to a fiber-reinforced thermoplastic semifinished product.

The reinforcing fibres are in particular constituted by cut glass fibres, but it is also possible to use other mineral, inorganic or artificial fibres, such as carbon, aramide or polyester fibres. When reference is made hereinafter to glass fibres, they can be replaced by the other aforementioned fibres. Cut glass fibres are used in large quantities for producing fibre glass-reinforced plastic parts. The glass fibres are bonded by a binder, which as the main constituent or matrix has a thermoplastic material, such as polypropylene, as well as additionally carbon black, wax and other additives and chemical couplers. A semifinished product compressible to a moulding in a press takes place by strewing the fibres to form a fleece and impregnating the same with liquid synthetic resin. In another form, the fibres are process in a liquid phase to a suspension, which is processed to a tangled fibrous material by stirring or mixing movements. Here again liquid synthetic resins or pulverulent binders are used in conjunction with an aqueous suspension. In the latter case, the suspension is dried after forming a tangled fibre fleece. In both cases the thickness and width of the fleece must be adapted to the mouldings to be produced, the former being necessary and the latter ensures that there is not excessive waste. The fleece must then be cut into individual plates to adapt to the mouldings to be produced.

It has also already been proposed (German application P 36 04 88.7) to add liquid wetting agents with a proportion of max 20% by weight, in order in this way to obtain moist, but still free-flowing material, which is packed as an intermediate product in plastic bags and forwarded to the further processing enterprise, or can optionally be processed in a heated belt press to preshaped plate material.

In particular, the first-mentioned processes are very complicated and involve high costs. In all the aforementioned processes preparation and compounding of the semifinished product are required, which makes the processes inflexible and prevents or makes very difficult adaptations to other mouldings.

It has also already been proposed to whirl glass fibre bundles together with the thermoplastic material-containing binders in a turbulence or whirling chamber to form a cotton wool or wadding-like belt and then to pack same under vacuum, preferably in plastic bags made from material compatible with the thermoplastic material of the binder and in particular identical therewith, or to make same directly available for further processing (German application P 37 04 035.0).

On the basis thereof, the air underlying the present invention resides in providing an easy handling, effortlessly transportable and largely automatically further processable semifinished product without high energy costs being required, particularly in such a way that there is no need for preparation and compounding of the starting material as a function of the mouldings to be produced.

According to the inventive process, a pourable initial product constituted by fibres and thermoplastic material-containing binders is heated to above the melting point of the thermoplastic material only in a thin covering area. An inventive apparatus, particularly for performing the process, is characterized in that there is a melting device with a melting channel, through which the material to be processed is pressed as a continuous strand and a cooling device is connected to the melting device. A semifinished product fulfilling the indicated requirements is characterized by a solid covering of fibres and thermoplastic material resolidified after melting and a felt or cotton wool-like core of a fibre-polymer mixture.

The inventive process makes it possible to simplify the production sequence, as well as ensuring a high degree of automation during the production of mouldings. For further processing purposes, there is no need for a preparation and compounding of the semifinished product adapted to the end product. Therefore costs can be kept low. Through constructing the inventive apparatus as a closed system it is possible to prevent decomposition of the thermoplastic matrix by overheating, so that there is a reduced fire risk and better environmental conditions. The inventive process permits considerable variation possibilities with regards to the use of higher grade thermoplastics (e.g. PA, PTP) and the use of different reinforcing fibres. In particular, the inventively produced semifinished product can be preheated for further processing by inert hot gases or hot air blown through the felt or cotton wool-like core to below the melting point of the polymer or can be heated to above its melting point, which is not very energy-intensive, particularly when recirculating the heating gas.

The starting material can in particular be supplied in a standard pack size and need not, as is the case for glass mat production, be adapted according to the special charge weights, etc. of the mouldings.

If not adequately compressed material, as is the case when using the material produced according to the prior art, but instead the aforementioned cotton wool-like felt is directly supplied, according to a preferred embodiment of the invention, the cotton wool-like initial product is precompressed and directly supplied to the continuous strand or directly upstream of the melting device is provided a compressing station. According to a further development the compression station has a cooled compressing channel, to which is directly connected the melting channel of the melting device and that at the end of the compressing channel remote from the transition point from compressing channel to melting channel is movably arranged a compressing and feed plunger and in particular that the melting channel of the melting device is surrounded by heating elements over its entire length.

According to a preferred construction a vacuum is applied when compressing the starting material, so as to avoid air inclusions and the like. In particular in the vicinity of the compressing station, it is possible to provide vacuum lines by means of which the vacuum is applied. According to a preferred development the melting channel is provided over its entire length with heating elements. The heating of the material in the melting channel takes place to a temperature, which is higher than the melting point of the thermoplastic material and is in particular up to 100° C. above the melting point. The inventive process permits a very high throughput of material to be melted, so that it is readily possible to achieve a throughput of 2 kg or more per minute.

The wall of the melting channel is briefly heated by its heating elements to well above the melting point of the polymer of the starting product, so that the polymer only melts in a relatively thin covering area, but not in the inner core of the wadding-like fibre-polymer material located in the channel. This is followed by cooling, so that the melted polymer resolidifies and is plasticized. It is important to have a rapid heating, so that the outer area of the polymer melts, without the high temperature passing into the core area and there is advantageously a subsequent, fast cooling.

Further advantages and features of the invention can be gathered from the claims and the following description of an embodiment of the inventive apparatus for producing a matched quantity of a mouldable, fibre-reinforced thermoplastic material, with reference to the drawings accompanying.

DETAILED DESCRIPTION

Figure 1:
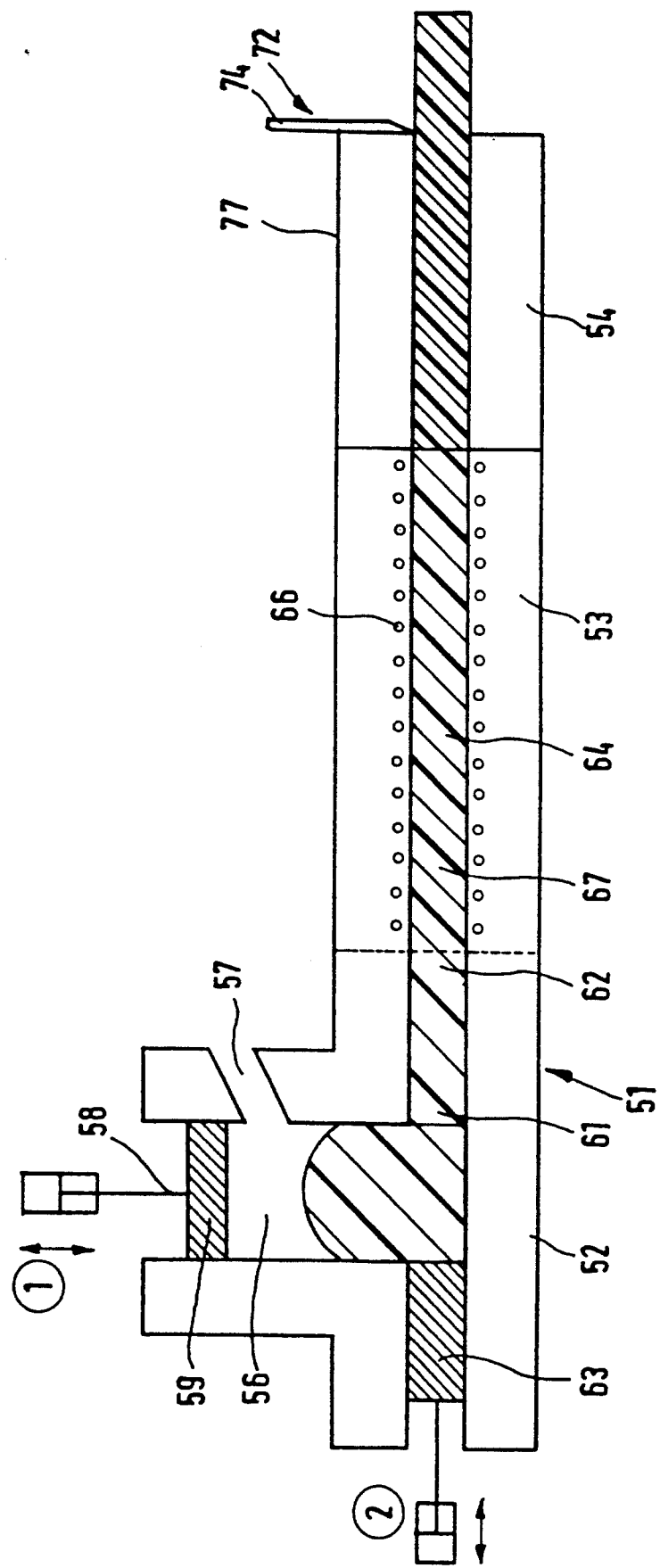
FIG. 1 is a diagrammatic representation of the inventive apparatus in side view.

The inventive apparatus generally designated by the reference number 51 for producing dimensionally stable semifinished product from fibre-reinforced thermoplastic material has a compressing station 52, a melting channel 64 and a cooling station 54. Compressing station 52 has a receiving and precompressing chamber 56, into which issues a supply duct 57 and which as a piston and cylinder unit 58 is provided with a precompressing plunger 59, which can be driven in an appropriate manner, in particular hydraulically. In its end region 61 remote from plunger 59, the supply and precompressing chamber 56 passes into a compressing chamber 62. The latter has a compressing and feed piston 63, which is also preferably hydraulically operated.

A melting channel 64 of the melting device 53 is connected to the channel-like compressing chamber 62. Melting channel 64 is surrounded by heating elements 66, by the fibre-reinforced thermoplastic material 67 therein is heated to above its melting point in its outer covering area.

The aforementioning cooling station 54 is connected to the melting device 53. At the end remote from the melting device 53, the cooling station 54 is followed by a separating device 72, which has a preferably hydraulically operated separating slide 74. The channel can have a random square or rectangular cross-sectional shape, but preferably has a circular cross-section.

The raw material is supplied through the supply duct 57. This can take place portionwise, in that supply duct 57 feeds a given material quantity into the precompressing chamber 56 and is then precompressed by the precompressing plunger 59. Upstream of the supply duct 57 can be provided a bin, which contains the material to be processed, e.g. in free-flowing form. A blocking slide is preferably provided at the end of the supply duct in this case. The material to be processed is a glass fibre-filled thermoplastic material, which is present in pourable or free-flowing form and is in particular packed in plastic bags (German patent application P 36 04 888.7).

It can be a cotton wool or wadding-like felt material produced by whirling a binder containing fibres and thermoplastic material, which is supplied directly to the inventive apparatus from a whirling chamber, or which is made available in plastic bag form after packing (German patent application P 37 04 035.9). To the extent that the starting product is in plastic bags, it can be poured out of the same and supplied by opening, such as cutting open the same. However, preference is given to the use of plastic bags made from a material, which is compatible with the thermoplastic material of the binder and is in particular the same material. In this case the material, together with the plastic bags, can be supplied directly view supply duct 57 to the receiving and precompressing chamber 56.

Following the supply to the receiving and precompressing chamber 56, as stated, the material is precompressed by plunger 59 and pressed into compressing channel 62. The plunger 59 remains in its lower position closing with the upper boundary wall of channel 62. Piston 63 then assumes the responsibility for the main compression of the material, in that it is moved in the direction of the melting channel and further compresses the material, while moving the material into and through melting channel 64. During this main compression, a vacuum can be simultaneously applied to the compressing channel 62, in order to assist compression. In melting station 53, 64, only the outer area of the material is heated to above the melting point of its polymer, whilst the temperature in an inner core area remains below the melting point. Thus, only a covering area of the polymer is melted, but the core area of the material remains felt-like.

Figure 2:
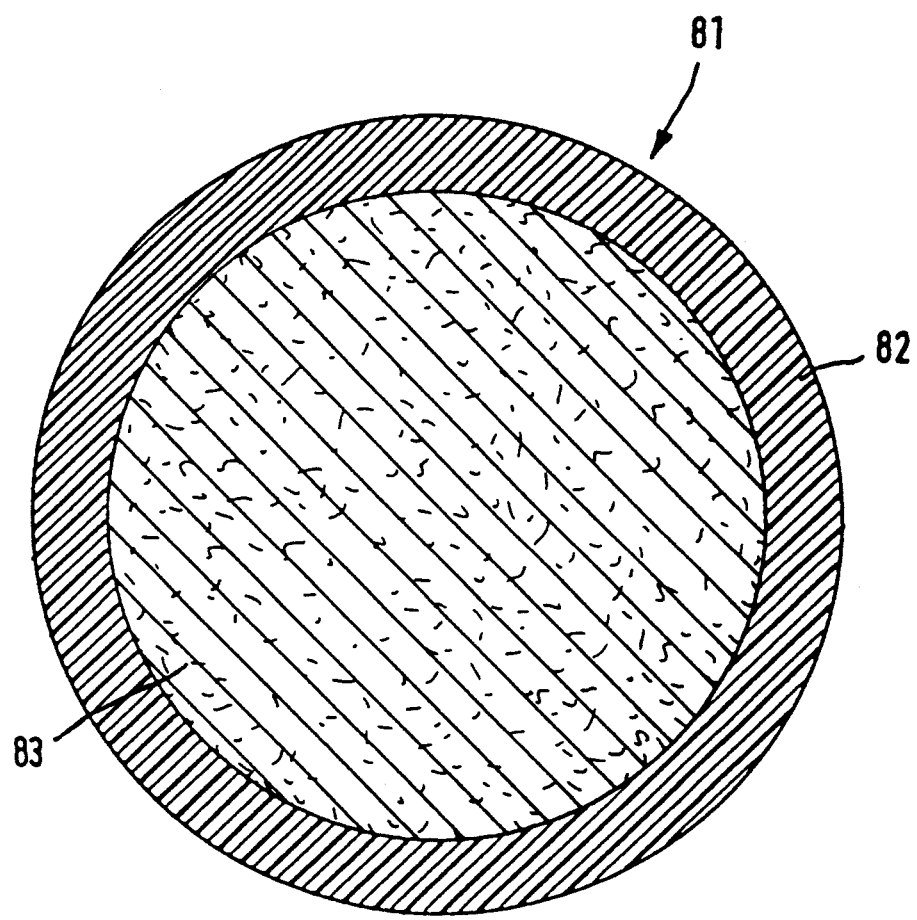
FIG. 2 is a cross-section through a semifinished product.

The material, whose outer area is melted in melting channel 64, is then introduced into the cooling station 54, where the material previously heated in melting channel 64 is cooled again. The cooling station can have cooling lies through which flow a cooling medium, the latter preferably being cold water, but other cooling media can also be used. Thus, the outer covering area of the material conveyed in the channel made liquid-pasty by heating is rapidly cooled and solidifies to a solid wall surrounding the wadding or felt-like core, so that a dimensionally stable strand is obtained. The latter is ejected at the end of cooling device 54 remote from melting channel 53 and can be cut into random portions thereby means of cutting device 72. At one operating channel of the inventive apparatus 51 having a circular cross-section is formed a semifinished product 81 (FIG. 2) in the form of a cylinder with a rigid, plasticized outer covering 82 and an inner felt or wadding-like compressed core 83 of the not melted starting product. The semifinished product 81 is dimensionally stable and can in this form be transported and processed and in particular again completely heated and melted, so that the desired mouldings can be produced therefrom. An important advantage of the inventive semifinished product 81 is that also in the felt-like core 83 there is no separation of homogeneously mixed fibres on the one hand and polymer-containing binders on the other and instead the homogeneous mixture is maintained even during prolonged storage and transportation, while for final production there can be a relatively low energy-consuming, rapid at least preheating of the inner core by hot inert gas, such as helium or nitrogen, as well as hot air, which was not hitherto possible. The maintenance of the homogeneous distribution is in particular assisted by the fact that the felt or wadding-like core is kept in its compressed and compacted form by the rigid, plasticized outer covering. It has been found that no felt-like material appears or is pressed out at the interfaces of the cylinders separated by the cutting device 72. There can optionally be also a thin, plasticized grid, net or honeycomb structure as a result of the use of hot slide, which melts a thin surface film of the separated end faces of the semifinished products 81.

We claim:

1. Semifinished product comprising a compressed felt or wadding core and a dimensionally stable rigid outer covering formed on said core, said covering and said core being formed of the same homogenous mixture of fibers and thermo-plastic material.

2. Semifinished product according to claim 1, wherein the semifinished product has an oval shape.

3. Semifinished product according to claim 1, wherein the semifinished product has a cylindrical shape.

4. Semifinished product according to claim 3, wherein a thickness of the outer covering forming the dimensionally stable rigid outer covering is less than 20 percent of a radius of the semifinished product.

5. Semifinished product according to claim 4, wherein the thickness of the rigid outer covering is no greater than 10 mm.

* * * * *